United States Patent
Maksimovic et al.

(10) Patent No.: US 7,079,589 B1
(45) Date of Patent: Jul. 18, 2006

(54) SERIAL DIGITAL COMMUNICATION SUPERIMPOSED ON A DIGITAL SIGNAL OVER A SINGLE WIRE

(75) Inventors: Dragan Maksimovic, Boulder, CO (US); James Thomas Doyle, Nederland, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 779 days.

(21) Appl. No.: 10/166,822

(22) Filed: Jun. 10, 2002

(51) Int. Cl.
*H04L 27/20* (2006.01)
(52) U.S. Cl. .................................................. 375/295
(58) Field of Classification Search ................ 375/295, 375/316, 340, 342, 355, 363, 238, 239; 370/509, 370/510, 514, 527, 528; 332/106, 109, 112
See application file for complete search history.

(56) References Cited

U.S. PATENT DOCUMENTS

| | | | | |
|---|---|---|---|---|
| 5,774,084 A | * | 6/1998 | Brombaugh et al. | 341/152 |
| 6,359,525 B1 | * | 3/2002 | Mohan et al. | 332/108 |
| 6,625,241 B1 | * | 9/2003 | Mejia | 375/372 |
| 6,754,238 B1 | * | 6/2004 | Lentine et al. | 370/528 |

OTHER PUBLICATIONS

U.S. Appl. No. 10/053,858, filed Jan. 19, 2002, Maksimovic et al.
U.S. Appl. No. 10/106,428, filed Mar. 26, 2002, Doyle et al.
Dragan Maksimovic, Bruno Kranzen, Sandeep Dhar and Ravindra Ambatipudi, U.S. Appl. No. 10/053,226, filed Jan. 19, 2002, entitled "An Adaptive Voltage Scaling Digital Processing Component and Method of Operating the Same".
Bruno Kranzen and Dragan Maksimovic, U.S. Appl. No. 10/053,227, filed Jan. 19, 2002, entitled "Adaptive Voltage Scaling Clock Generator for Use in a Digital Processing Component and Method of Operating the Same".
Dragan Maksimovic and Sandeep Dhar, U.S. Appl. No. 10/053,828, filed Jan. 19, 2002, entitled "System for Adjusting a Power Supply Level of a Digital Processing Component and Method of Operating the Same".
Dragan Maksimovic, Ravindra Ambatipudi, Sandeep Dhar and Bruno Krazen, U.S. Appl. No. 10/053,228, filed Jan. 19, 2002, entitled "An Adaptive Voltage Scaling Power Supply for Use in a Digital Processing Component and Method of Operating the Same".

(Continued)

*Primary Examiner*—Khanh Tran
(74) *Attorney, Agent, or Firm*—Mark C. Pickering (57) ABSTRACT

A communications system interleaves control pulses between the transitions in a serial bit stream to form an interleaved signal. The serial bit stream has a series of transitions and a series of gaps between transitions where a transition can not occur. An interleaver identifies gaps in the serial bit stream, and inserts the control pulses in the gaps to form the interleaved signal. The interleaved signal reduces the pin count when the interleaved signal is transmitted between chips.

30 Claims, 9 Drawing Sheets

OTHER PUBLICATIONS

James T. Doyle and Dragan Maksimovic, U.S. Appl. No. 10/160,428, filed Mar. 26, 2002, entitled "Method and System for Minimizing Power Consumption in Mobile Devices Using Cooperative Adaptive Voltage and Threshold Scaling".

Robert W. Erickson and Dragan Maksimovic, *Fundamentals of Power Electronics,* Second Edition, Kluwer Academic Publishers, 2001, pp. 333.

Krisztian Flautner, Steven Reinhardt and Trevor Mudge, Automatic Performance Setting for Dynamic Voltage Scaling [online]. May 30, 2001, [retrieved on Feb. 2, 2003]. Retrieved from the Internet: <URL: http://www.eecs.umich.edu/~tnm/papers/mobicom01.pdf>. pp. 1-12.

Texas Instruments, "Synchronous-Buck PWM Controller With NMOS LDO Controller", TPS5110, SLVS025A-Apr. 2002, Revised Jun. 2002.

Intel XScale Core, Developer's Manual, Dec. 2000, [online], [retrieved on Feb. 2, 2003]. Retrieved from the Internet: <URL: http://developer.intel.com/design/intelxscale/27347301.pdf>. pp. 1-1 through B-1.

* cited by examiner

FIG. 1

FIG. 2A SBS

FIG. 2B SBS

FIG. 2C SBS

FIG. 3A WMS

FIG. 3B WMS

FIG. 3C WMS

FIG. 3D WMS

FIG. 3E WMS

SERIAL DIGITAL COMMUNICATION SUPERIMPOSED ON A DIGITAL SIGNAL OVER A SINGLE WIRE

BACKGROUND OF THE INVENTION

1. Field of the Invention

The present invention relates to serial digital communications and, more particularly, to a serial digital communication superimposed on a digital signal over a single wire.

2. Description of the Related Art

The individual chips on a printed circuit board communicate with each other via metal traces that run from the pins on a first chip to the pins on a second chip. Thus, for example, if the first chip outputs a first control signal on a first pin, the second chip receives the first control signal on a pin that is electrically connected to the first pin via a metal trace. Similarly, if the first chip outputs a second control signal on a second pin, the second chip receives the second control signal on a pin that is electrically connected to the second pin via a metal trace.

The size of a chip is often driven by the number of pins that are required by the chip. Thus, reducing the number of pins required by a chip can significantly reduce the size of the chip. Smaller chips require less printed circuit board space which, in turn, leads to more compact and less expensive designs. As a result, there is a need for techniques that can reduce the number of pins required by a chip.

DETAILED DESCRIPTION

Figure 1:
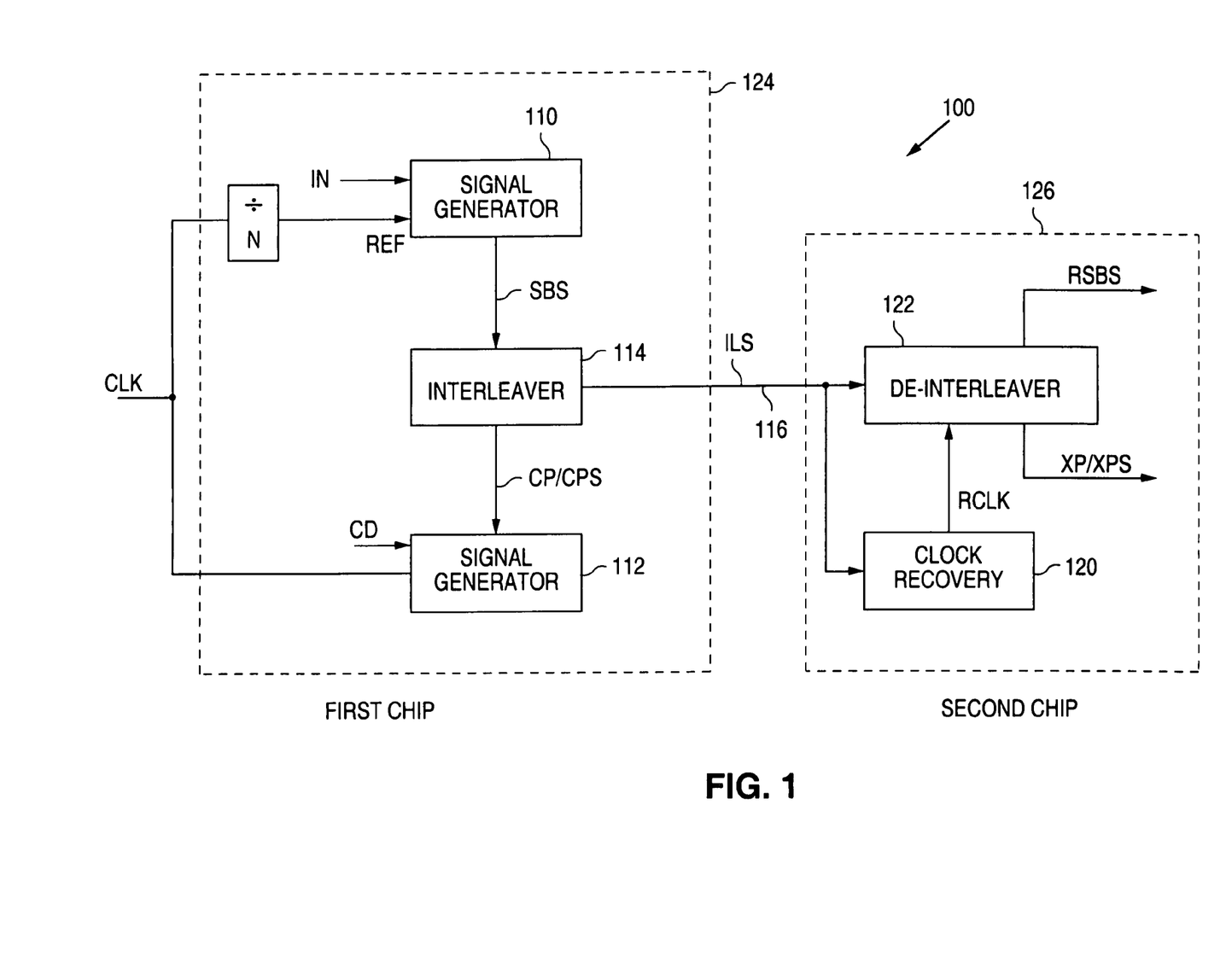
FIG. 1 is a block diagram illustrating a communications system 100 in accordance with the present invention.

FIG. 1 shows a block diagram that illustrates an example of a communications system 100 in accordance with the present invention. As described in greater detail below, communications system 100 interleaves two digital signals to generate an interleaved signal, transmits the interleaved signal between devices, and de-interleaves the interleaved signal to generate signals that represent the original two digital signals.

As shown in FIG. 1, communications system 100 includes a signal generator 110 that generates a serial bit stream SBS in response to an input signal IN and a reference clock signal REF. The input signal IN can be implemented as a band-limited analog voltage that ranges from a low voltage to a high voltage, with a center voltage that lies between the low voltage and the high voltage.

Alternately, the input signal IN can be implemented as a series of digital words, input serially or in parallel, that have a series of values that are digital representations of a bandlimited analog voltage. For example, a first digital word can represent the low voltage, an intermediate digital word can represent the center voltage, and a last digital word can represent the high voltage. In addition, the reference clock signal REF has a frequency and a 50% duty cycle (the clock signal is high and low for equal periods of time).

Signal generator 110 converts the input signal IN into the serial bit stream SBS so that the serial bit stream SBS includes a time reference that is superimposed or implicit in the serial bit stream SBS. The serial bit stream SBS has transitions that can only change by the available bandwidth. As a result, there are gaps in the serial bit stream SBS where transitions can not occur.

A number of approaches can be utilized to convert the input signal IN into the serial bit stream SBS so there are gaps in the serial bit stream SBS where transitions can not occur. For example, signal generator 110 can be implemented as a pulse width modulator that generates the serial bit stream SBS by modulating the width of the reference clock signal REF in response to the input signal IN.

Figure 2A:
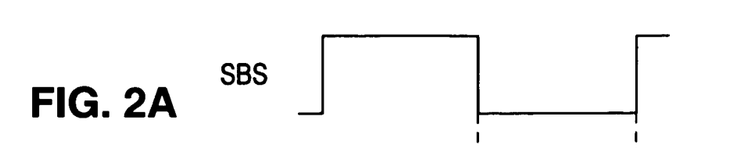
FIGS. 2A–2C are timing diagrams illustrating the operation of signal generator 110 in accordance with a first embodiment of the present invention.
Figure 2B:
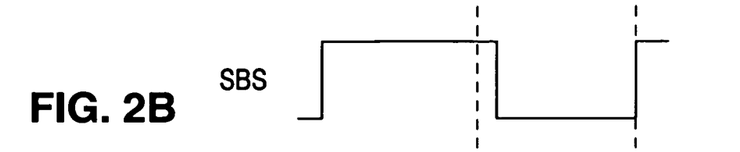
Figure 2C:
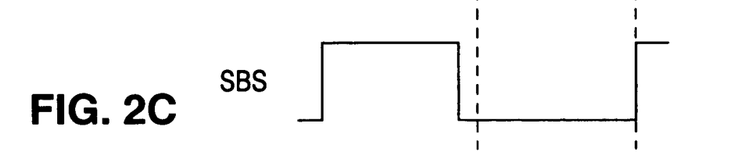

FIGS. 2A–2C show timing diagrams that illustrate an example of the operation of signal generator 110 as a pulse width modulator in accordance with the present invention. FIG. 2A shows a timing diagram that illustrates an example of a pulse in the serial bit stream SBS when the input signal IN is equal to the center voltage or the intermediate digital word in accordance with the present invention. As shown in FIG. 2A, when the input signal IN is equal to the center voltage or the intermediate digital word, the pulse width modulator can generate a pulse in the serial bit stream SBS that has a 50% duty cycle.

FIG. 2B shows a timing diagram that illustrates an example of a pulse in the serial bit stream SBS when the input signal IN is greater than the center voltage or intermediate digital word in accordance with the present invention. As shown in FIG. 2B, when the input signal IN is greater than the center voltage or the intermediate digital word, the pulse width modulator increases the duty cycle of the pulse to a value that is greater than 50%.

FIG. 2C shows a timing diagram that illustrates an example of a pulse in the serial bit stream SBS when the input signal IN is less than the center voltage or the intermediate digital word in accordance with the present invention. As shown in FIG. 2C, when the input signal IN is less than the center voltage or the intermediate digital word, the pulse width modulator decreases the duty cycle of the pulse to a value that is less than 50%.

The duty cycle of a pulse in the serial bit stream SBS can be changed by synchronizing the rising edge of the pulse with the rising edge of the reference clock signal REF, and moving the position of the falling edge of the pulse in response to changes in the input signal IN.

Alternately, the duty cycle of a pulse in the serial bit stream SBS can be changed by synchronizing the falling edge of the pulse with the falling edge of the reference clock signal REF, and moving the position of the rising edge of the pulse in response to changes in the input signal IN. Further, the duty cycle of a pulse in the serial bit stream SBS can be changed by moving, both the rising edge and the falling edge of the pulse.

One characteristic of a width modulated signal, which is required by the present invention, is that, from pulse-to-pulse, the moving edge is limited to a maximum movement. As a result, the moving edge can not change from a 50% duty cycle to a 100% duty cycle from one pulse to the next even if the input signal IN moves from the center voltage to the high voltage with a very sharp rising edge, or from the intermediate digital word to the last digital word.

Figures 3A, 3B:
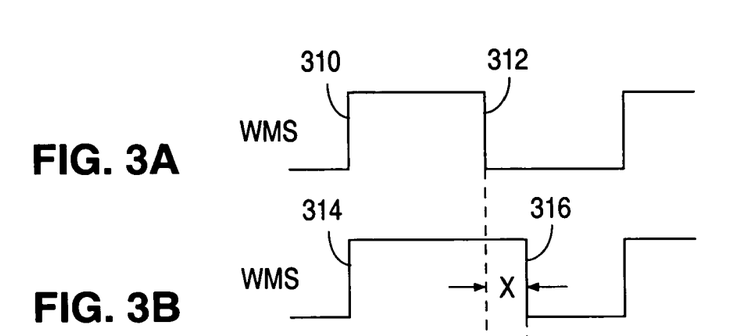
FIGS. 3A–3E are timing diagrams illustrating the maximum movement of an edge of the width-modulated signal WMS in accordance with the present invention.

FIGS. 3A–3E show timing diagrams that illustrate an example of the maximum movement of an edge of a width modulated signal WMS in accordance with the present invention. FIG. 3A shows a timing diagram that illustrates an example of a first pulse of the width modulated signal WMS in accordance with the present invention. As shown in FIG. 3A, the first pulse has a rising edge 310 and a falling edge 312, and a 50% duty cycle.

FIG. 3B shows a timing diagram that illustrates an example of a second pulse of the width modulated signal WMS in accordance with the present invention. As shown in FIG. 3B, the second pulse has a rising edge 314 and a falling edge 316. As further shown in FIG. 3B, assuming the input voltage has spiked up from the center voltage to the high voltage, falling edge 316 can only be advanced a maximum distance X from the position of falling edge 312.

Figure 3C:
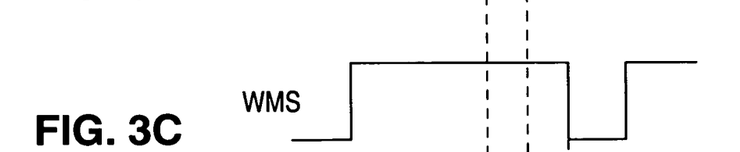

FIG. 3C shows a timing diagram that illustrates an example of a third pulse of the width modulated signal WMS in accordance with the present invention. As shown in FIG. 3C, the third pulse has a rising edge 320 and a falling edge 322. As further shown in FIG. 3C, assuming the input voltage remains equal to the high voltage, falling edge 322 can only be advanced the maximum distance X from the position of falling edge 316, a distance 2× from falling edge 312.

Figure 3D:
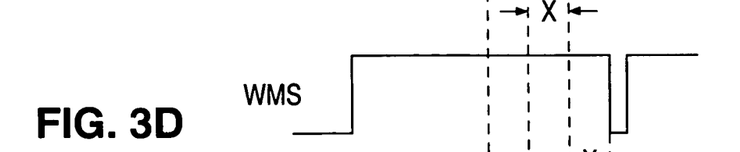
Figure 3E:
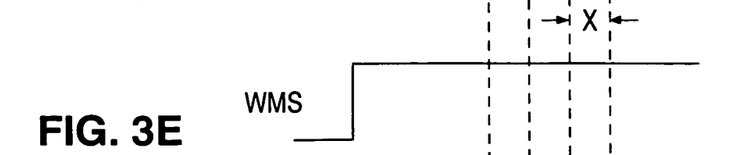

FIG. 3D shows a timing diagram that illustrates an example of a fourth pulse of the width modulated signal WMS in accordance with the present invention. As shown in FIG. 3E, the fourth pulse has a rising edge 324 and a falling edge 326. As further shown in FIG. 3E, assuming the input voltage remains equal to the high voltage, falling edge 326 can again only be advanced the maximum distance X from the position of falling edge 312.

FIG. 3E shows a timing diagram that illustrates a fifth pulse of the width modulated signal WMS in accordance with the present invention. As shown in FIG. 3E, a 100% duty cycle is achieved. Thus, as shown in FIGS. 3A–3E, when the input voltage spikes up from the center voltage to the high voltage, it takes four steps or four pulses before the falling edge of the width modulated signal WMS can change from a 50% duty cycle to a 100% duty cycle. When signal generator 110 is implemented as a pulse width modulator, signal generator 110 can be formed to use other numbers of steps or pulses to move from a 50% duty cycle to a 100% duty cycle, the four pulses of FIGS. 3A–3E being only one example.

A width modulated signal need not have the ability to range from a 0% duty cycle to a 100% duty cycle, but can be restricted to a smaller range of duty cycles. For example, a width modulated signal can have a duty cycle that cannot be smaller than a minimum duty cycle, or greater than a maximum duty cycle.

Figure 4A:
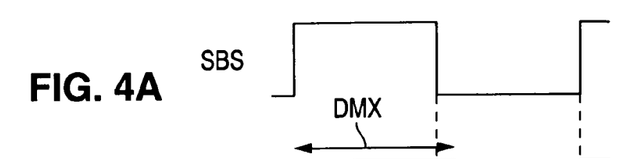
FIGS. 4A–4C are timing diagrams illustrating an example of the operation of signal generator 110 as a limited pulse width modulator in accordance with the present invention.
Figure 4B:
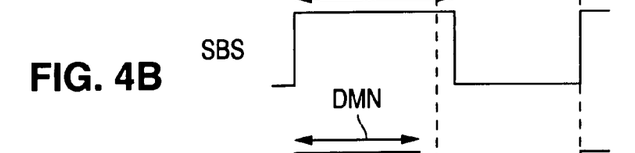
Figure 4C:
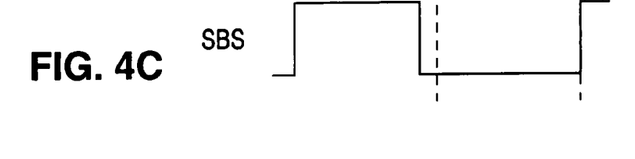

FIGS. 4A–4C show timing diagrams that illustrate an example of the operation of signal generator 110 as a limited pulse width modulator in accordance with the present invention. FIG. 4A shows a timing diagram that illustrates an example of a pulse in the serial bit stream SBS when the input signal IN is equal to the center voltage or the intermediate digital word in accordance with the present invention. As shown in FIG. 4A, when the input signal IN is equal to the center voltage or the intermediate digital word, a pulse width modulator can generate a pulse of the serial bit stream SBS that has a 50% duty cycle.

FIG. 4B shows a timing diagram that illustrates an example of a pulse in the serial bit stream SBS when the input signal IN is equal to the high voltage or the last digital word in accordance with the present invention. As shown in FIG. 4B, when the input signal IN has its maximum value, the pulse width modulator increases the duty cycle of the pulse to a maximum value DMX that is greater than 50% and less than 100%.

FIG. 4C shows a timing diagram that illustrates an example of a pulse in the serial bit stream SBS when the input signal IN is equal to the low voltage or the first digital word in accordance with the present invention. As shown in FIG. 4C, when the input signal IN has its minimum value, the pulse width modulator decreases the duty cycle of the pulse to a minimum value DMN that is less than 50% and greater than 0%.

As noted above, a number of approaches can be utilized to convert the input signal IN into the serial bit stream SBS so there are gaps in the serial bit stream SBS where transitions can not occur. As another example, signal generator 110 can be implemented with a modulator, such as a delta modulator, that generates a periodic signal.

A delta modulator generates the serial bit stream SBS by modulating the polarity of the reference clock signal REF in response to the input signal IN. The delta modulator outputs a pulse with each leading edge of the reference clock signal REF. The pulse is positive if the input signal IN is greater than an integrated feedback signal, and negative if the input signal IN is less than the integrated feedback signal.

Signal generator 110 can also be implemented with other modulators where the edges can be predicted, such as a pulse position modulator. With pulse position modulation, a number of clock periods are logically grouped together to form a symbol period. The symbol period, in turn, represents an n-bit sequence where clock periods within the symbol period represent different values of n-bit sequence.

For example, every four clock periods can be logically grouped together to form a symbol period that represents a two-bit sequence. The first clock period of the symbol period can be assigned to represent the logic sequence 00, while the second clock period of the symbol period can be assigned to represent the logic sequence 01. Similarly, the third first clock period of the symbol period can be assigned to represent the logic sequence 10, while the fourth clock period of the symbol period can be assigned to represent the logic sequence 11.

Thus, a 00 is output by generating a clock pulse within the first clock period of the symbol period, and a 01 is output by generating a clock pulse within the second clock period of the symbol period. Similarly, a 01 is output by generating a clock pulse within the third clock period of the symbol period, and a 11 is output by generating a clock pulse within the fourth clock period of the symbol period.

Figure 5A:
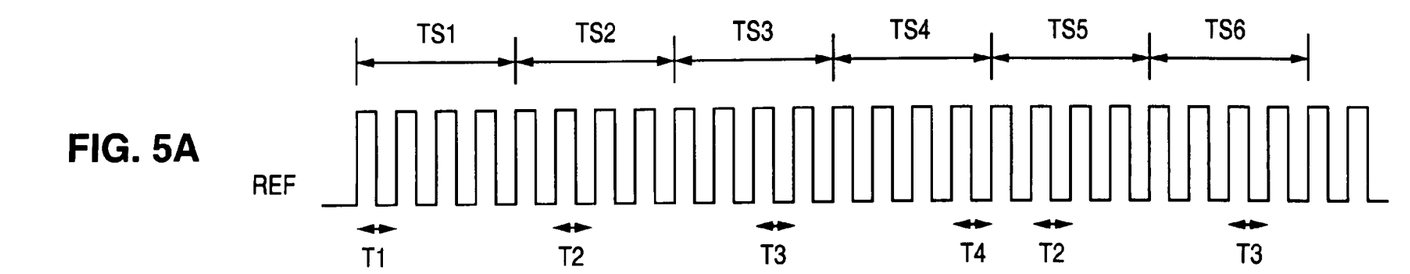
FIGS. 5A–5B are timing diagrams illustrating an example of the operation of signal generator 110 as a pulse-position modulator in accordance with the present invention.
Figure 5B:
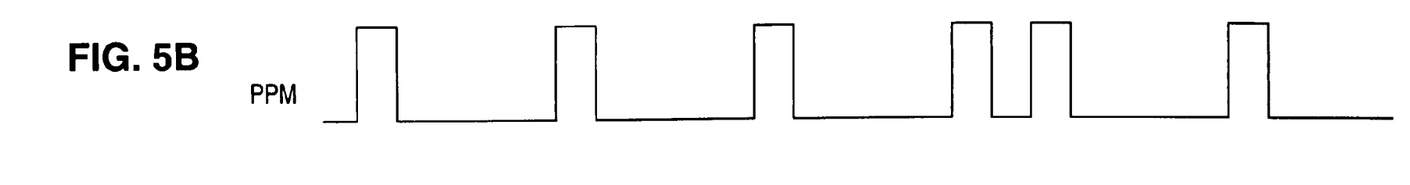

FIGS. 5A–5B show timing diagrams that illustrate an example of the operation of signal generator 110 as a pulse position modulator in accordance with the present invention. FIG. 5A shows a timing diagram that represents the reference clock signal REF. FIG. 5B shows a timing diagram that illustrates a pulse position modulated signal PPM.

As shown in FIGS. 5A–5B, a pulse is generated within a first clock period T1 of a symbol period TS1 when a logic 00 is output, and a second clock period T2 of a symbol period TS2 when a logic 01 is output. Similarly, a pulse is generated within a third clock period T3 of a symbol period TS3 when a logic 10 is output, and a fourth clock period T4 of a symbol period TS4 when a logic 11 is output.

Thus, signal generator 110 outputs a serial bit stream SBS that has gaps in the serial bit stream SBS where transitions can not occur in response to the input signal IN and the reference clock signal REF.

Returning to FIG. 1, communications system 100 also includes a signal generator 112 that generates a control pulse CP that conveys control information in response to control data CD and a clock signal CLK. Alternately, signal generator 112 can generate a series of control pulses CPS in response to control data CD and the clock signal CLK, depending on the amount of information to be conveyed.

In addition, communications system 100 includes an interleaver 114 that is connected to the first and second signal generators 110 and 112. Interleaver 114 identifies the position of an edge in the serial bit stream SBS, and determines the location of a gap in the serial bit stream SBS (where a transition in the serial bit stream SBS can not occur) based on the position of the edge. Once a gap has been identified, interleaver 114 inserts a control pulse CP or control pulses CPS into the gap.

When the serial bit stream SBS is implemented as a pulse width modulated signal, interleaver 114 determines the positions of the edges that are locked to the clock signal REF. In addition, interleaver 114 identifies the position of a moving edge, and then determines the range of positions of the next moving edge.

For example, interleaver 114 can detect that the rising edges of the serial bit stream SBS are locked to the clock signal REF. In addition, interleaver 114 can detect a falling edge, and then determine the range of positions that the next falling edge can have with respect to the next rising edge.

Interleaver 114 determines the range of positions based on the total number of steps or pulses that are required to move from a 50% duty cycle to either a 100% duty cycle or a 0% duty cycle. For example, assume that the rising edge of a pulse is synchronized to the rising edge of the reference signal REF, and the falling edge is moved to change the duty cycle. Further assume that the pulse has a 50% duty cycle, and 20 steps or pulses are required to move from a 50% duty cycle to a 100% duty cycle.

In this example, interleaver 114 detects the position of a falling edge (50% duty cycle), and determines that the maximum position of the next falling edge can only be one of 20 steps closer to a 100% duty cycle signal from the next rising edge or one of 20 steps closer to a 0% duty cycle signal from the next rising edge. Since interleaver 114 is determining the maximum change that can take place, interleaver 114 does not need any knowledge about the input signal IN.

Thus, regardless of whether the input signal IN changes or not, by identifying the position of a falling edge, the maximum position of the next falling edge can be determined because the next falling edge can only be, in the extreme, one step closer to a 100% duty cycle signal or one step closer to a 0% duty cycle signal.

Once interleaver 114 identifies the position of the edges in the serial bit stream SBS, interleaver determines the locations of gaps in the serial bit stream SBS (where a transition in the serial bit stream SBS can not occur) based on the position of the edges. In this example, a gap exists from the rising edge of the pulse to the extreme position of being one step closer to a 0% duty cycle. In addition, a gap exists from the extreme position of being one step closer to a 100% duty cycle and the rising edge of the next pulse. Once a gap has been identified, interleaver 114 inserts a control pulse CP or control pulses CPS into the gap.

When the serial bit stream SBS is implemented as a limited pulse width modulated signal, the process of identifying gaps is much simpler because once the rising edge has been detected, a gap will always exist between the rising edge and the edge that represents the minimum pulse width. In addition, a gap will always exist between the edge that represents the maximum pulse width and the rising edge of the next pulse.

When the serial bit stream SBS is implemented as a modulated periodic signal, such as a delta modulated signal, the process of identifying gaps is the same as with a limited pulse width modulated signal. Once the rising edge has been detected, a gap will always exist between the rising edge and falling edge of a pulse, and a gap will always exist between the falling edge of the pulse and the rising edge of the next pulse.

When the serial bit stream SBS is implemented as a pulse position modulated signal, interleaver 114 is provided with, or recovers, the clock signal and the symbol signal associated with the pulse position modulated signal. Interleaver 114 detects the beginning of each symbol period and the rising edge of each clock signal within the symbol period to determine which clock period within a symbol period is asserted. A gap can then exist both before and after the asserted clock period.

For example, assume that a symbol period includes four clock periods, and that the second clock period is asserted to represent the 01 bit sequence. In this case, a gap exists from the beginning of the symbol period to the rising edge of the second clock signal, and a gap exists from the rising edge of the third clock signal to the end of the symbol period.

Once interleaver 114 determines the location of a gap in the serial bit stream SBS (where a transition in the serial bit stream SBS can not occur), interleaver 114 inserts a control pulse CP or control pulses CPS into the gap to form an interleaved signal ILS.

When a pulse width modulated signal is used, the gap can be monitored via a count as the duty cycle moves away from a 50% duty cycle position. For example, if 20 steps or pulses are required to move from a 50% duty cycle to a 100% duty cycle, and the equivalent of 4 steps or pulses are required to insert and detect a control pulse CP, then interleaver 114 can stop inserting pulses when the count reaches or nears 16.

Figure 6A:
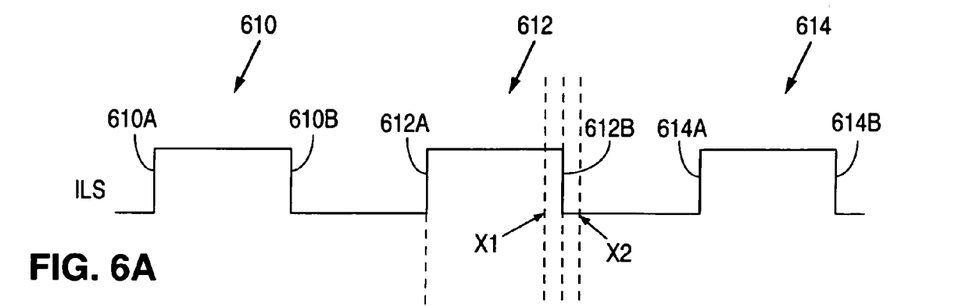
FIGS. 6A–6E are timing diagrams illustrating a pulse width modulated version of the interleaved signal ILS in accordance with the present invention.

FIGS. 6A–6E show timing diagrams that illustrate a pulse width modulated version of the interleaved signal ILS in accordance with the present invention. FIG. 6A shows a timing diagram that illustrates the pulse width modulated version of the interleaved signal ILS without the first control pulse CP in accordance with the present invention. As shown in FIG. 6A, the interleaved signal ILS has a first pulse 610, a second pulse 612, and a third pulse 614. First pulse 610 has a first edge 610A and a second edge 610B that is connected to first edge 610A.

Second pulse 612 has a first edge 612A that is connected to second edge 610B, and a second edge 612B that is connected to first edge 612A. Third pulse 614 has a first edge 614A that is connected to second edge 612B, and a second edge 614B that is connected to first edge 614A.

As noted above, interleaver 114 detects the position of second edge 610B and, based on the maximum distance of one step, determines that the position of second edge 612B will either be, in the extreme, a step ahead of the position of second edge 610B at position X1, or a step behind the position of second edge 610B at position X2.

Figure 6B:
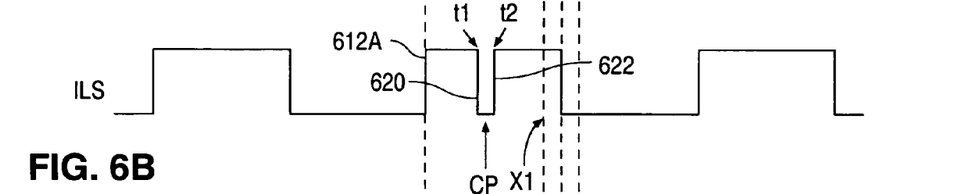

FIG. 6B shows a timing diagram that illustrates a first embodiment of the pulse width modulated version of the interleaved signal ILS with the first control pulse CP in accordance with the present invention. As shown in FIG. 6B, the first control pulse CP can be inserted by inverting and generating an edge 620 that changes from a logic high state to a logic low state at time t1, and an edge 622 that changes from the logic low state to the logic high state at time t2.

In addition, edge 620 (time t1) occurs at a position that is a detection distance away from edge 612A, and edge 622 (time t2) occurs at a position that is a detection distance away from position X1 (or edge 612B if a periodic signal is used). The detection distances, in turn, are the distances (times) required by the receiving logic to properly respond to edges 620 and 622.

Figure 6C:
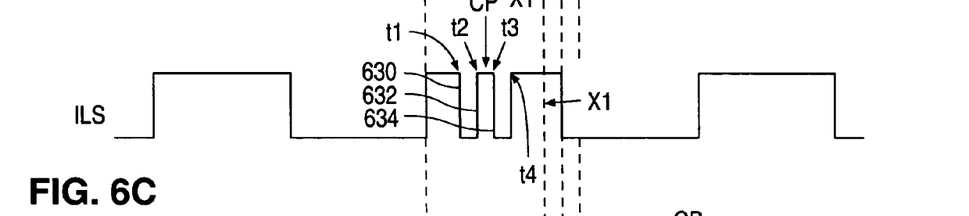

FIG. 6C shows a timing diagram that illustrates a second embodiment of the pulse width modulated version of the interleaved signal ILS with the first control pulse in accordance with the present invention. As shown in FIG. 6C, the first control pulse CP can also be inserted by generating an edge 630 that changes from a logic high state to a logic low state at time t1, and an edge 632 that changes from the logic low state to the logic high state at time t2. In addition, an edge 634 is generated that changes from a logic high state to a logic low state at time t3, and an edge 636 is generated that changes from the logic low state to the logic high state at time t4.

Figure 6D:
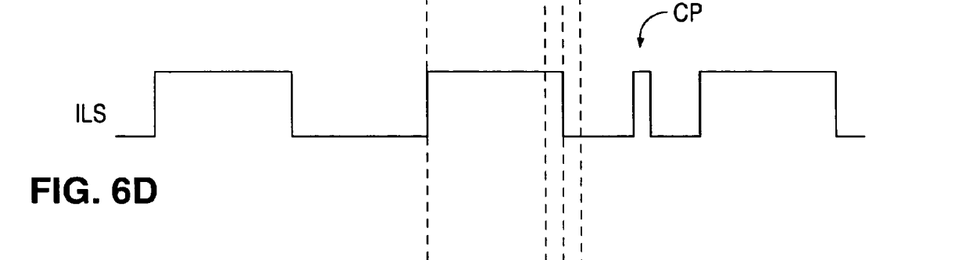

In addition to inserting the control pulse CP before edge 612B, the control pulse CP can alternately be inserted after the control pulse CP. FIG. 6D shows a timing diagram that illustrates a third embodiment of the pulse width modulated version of the interleaved signal ILS with the first control pulse CP in accordance with the present invention. As shown in FIG. 6D, the first control pulse CP is inserted after edge 612B in a manner similar to FIG. 6B (no inversion of control pulse CP required).

Figure 6E:
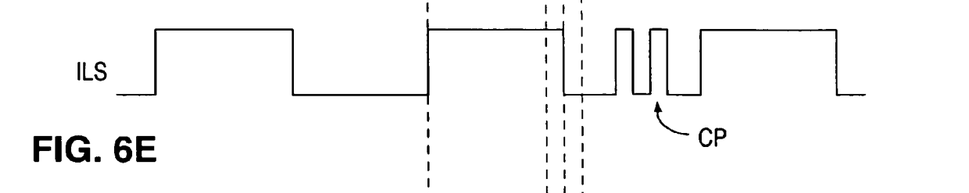
Figure 6F:
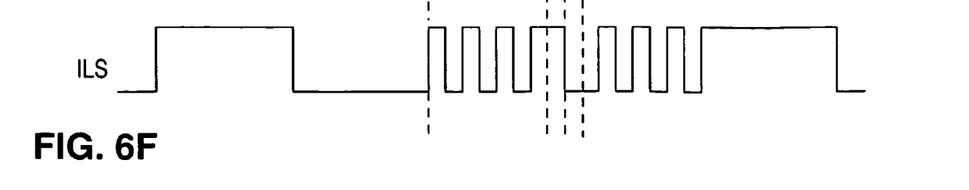

FIG. 6E shows a timing diagram that illustrates a fourth embodiment of the pulse width modulated version of the interleaved signal ILS with the first control pulse in accordance with the present invention. As shown in FIG. 6E, the first control pulse CP is inserted after edge 612B in a manner similar to FIG. 6C (inversion required). FIG. 6F shows a timing diagram that illustrates the insertion of multiple pulses in accordance with the present invention. As shown in FIG. 6F, not only can multiple pulses be inserted, depending on the position of the edge, but pulses can be inserted both before and after edge 612B. (Pulses can also be inserted either before or after edge 612B.)

Figure 7A:
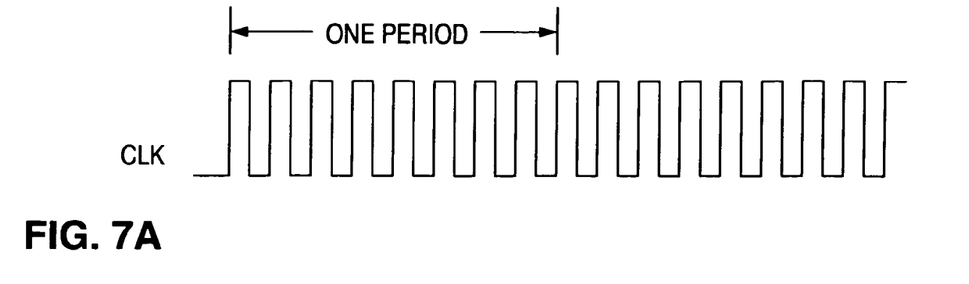
FIGS. 7A–7D are timing diagrams illustrating a limited pulse width modulated version of the interleaved signal ILS in accordance with the present invention.

FIGS. 7A–7D show timing diagrams that illustrate a limited pulse width modulated version of the interleaved signal ILS in accordance with the present invention. FIG. 7A shows a timing diagram that illustrates a clock signal CLK. The clock signal CLK has eight pulses that define one period of a limited pulse width modulated signal.

Figure 7B:
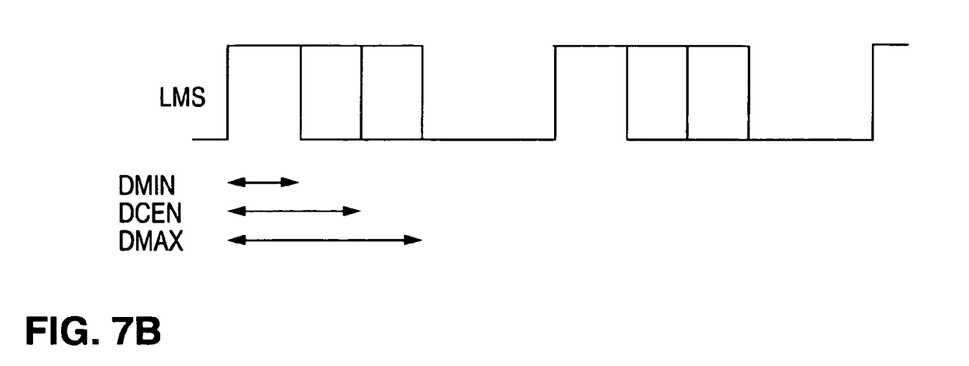
Figure 7C:
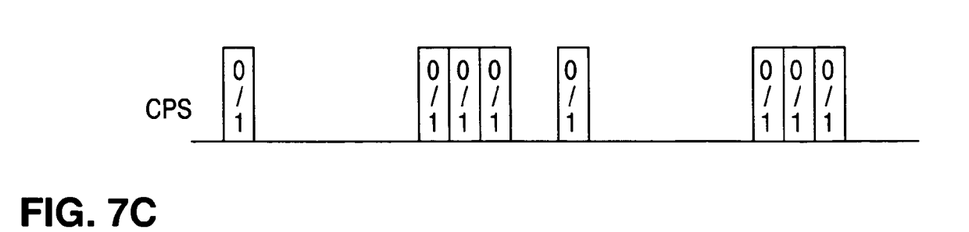

FIG. 7B shows a limited pulse width modulated signal LMS that has a minimum duty cycle signal DMIN, a center duty cycle signal DCEN, and a maximum duty cycle signal DMAX. FIG. 7C shows that four bits of the control signal CPS can be inserted into one period of the limited pulse width modulated signal LMS.

Figure 7D:
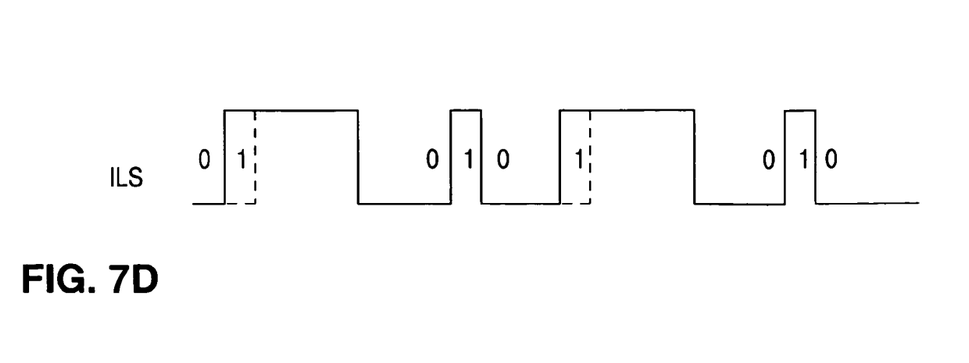

As shown in FIG. 7C, one bit lies before the falling edge of the minimum duty cycle signal DMIN, and three bits lie after the falling edge of the maximum duty cycle signal DMAX and before the rising edge of the next symbol period. FIG. 7D shows a limited pulse width modulated version of the interleaved signal ILS. As shown in FIG. 7D, the inserted pulse changes logic states when it differs from the logic state of the signal.

Referring again to FIG. 1, communications system 100 additionally includes a communications channel 116 that is connected to interleaver 114. In addition, a clock recovery circuit 120 and a de-interleaver 122 are connected to the communications channel 116 to receive the interleaved signal ILS.

Clock recovery circuit 120 detects and outputs a recovered clock signal RCLK in response to the interleaved signal ILS. De-interleaver 122 removes the control pulse CP or control pulses CPS from the interleaved signal ILS to output a received serial data bit stream RSBS that represents a recovered version of the serial data bit stream SBS. De-interleaver 116 also removes the serial bit stream SBS from the interleaved signal ILS to output a second control pulse XP or pulses XPS that represents a recovered version of the control pulse CP or pulses CPS, respectively.

One advantage of the present invention is that if signal generator 110, signal generator 112, and interleaver 114 are formed in a first chip 120, and clock recovery circuit 116 and de-interleaver 118 are formed in a second chip 122, the present invention eliminates one pin and the associated driver circuitry from the first chip, and one pin and the associated receiver circuitry from the second chip.

Thus, rather than the first chip outputting the serial bit stream SBS on a first pin and the control pulse CP or pulses CPS on a second pin, and the second chip receiving the serial bit stream SBS on a third pin and the control pulse CP or pulses on a fourth pin, the first chip need only provide one pin to output the interleaved signal ILS and the second chip need only provide one pin to receive the interleaved signal ILS.

In further accordance with the present invention, additional control pins can be removed by assigning different half-periods to different control signals. For example, as shown in FIGS. 6A–6E, a pulse or pulses that represent one control signal can be replaced between edges 612A and 612B, while a pulse or pulses that represent another control signal can be placed between edges 612B and 614A. Further, yet another control signal can be placed between edges 614A and 614B. Thus, in this example, three control signals and the serial bit stream SBS are interleaved together to form the interleaved signal ILS, thereby saving three pins on each chip.

Figure 8:
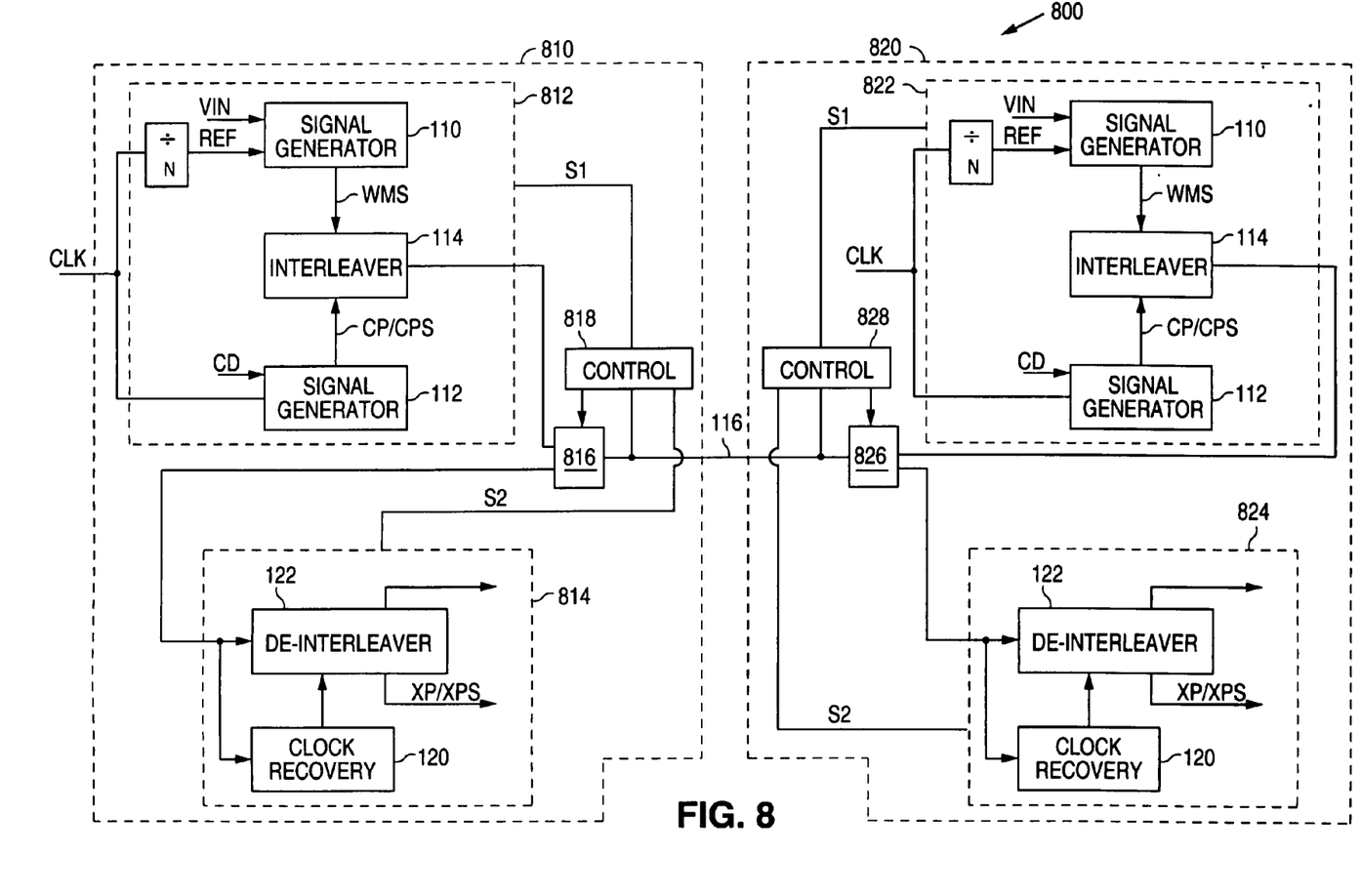
FIG. 8 is a block diagram illustrating an example of a communications system 800 in accordance with the present invention.

FIG. 8 shows a block diagram that illustrates an example of a communications system 800 in accordance with the present invention. Communications system 800 is similar to communications system 100 and, as a result, utilizes the same reference numerals to designate the structures which are common to both systems.

Communications system 800 differs from communications system 100 in that system 800 is bi-directional. As a result, a first chip 810 includes transmission circuitry 812 that includes signal generator 110, signal generator 112, and interleaver 114. In addition, first chip 810 also includes reception circuitry 814 that includes clock recovery circuit 120 and de-interleaver 122.

Further, first chip 810 includes a switch 816 that is connected to transmission circuitry 812 and reception circuitry 814, and a control circuit 818 that is connected to communications channel 116, transmission circuitry 812, reception circuitry 814, and switch 816.

Similarly, a second chip 820 includes transmission circuitry 822 that includes signal generator 110, signal generator 112, and interleaver 114. In addition, second chip 820 also includes reception circuitry 824 that includes clock recovery circuit 120 and de-interleaver 122.

In addition, second chip 820 includes a switch 826 that is connected to transmission circuitry 822 and reception circuitry 824, and a control circuit 828 that is connected to communications channel 116, transmission circuitry 822, reception circuitry 824, and switch 826.

In operation, control circuit 818 or control circuit 828 is designated as a master, and the remaining circuit is designated as a slave. Any of a number of handshake protocols can be used to pass control back and forth between control circuit 818 and control circuit 828.

When a control circuit has control of the communications channel, the control circuit changes the switch to connect its interleaver to the communications channel, and outputs a control signal to its interleaver that the interleaver can start transmitting. For example, when control circuit 818 has control of channel 116, control circuit changes switch 816 to connect interleaver 114 of transmission circuitry 812 to channel 116, and outputs a control signal S1 to interleaver 114 of transmission circuitry 812 that the interleaver can start transmitting.

When a control circuit does not have control of the communications channel, the control circuit changes the switch to connect its clock recovery circuit and de-interleaver to the communications channel, and outputs a control signal to its de-interleaver that the de-interleaver can start receiving.

For example, when control circuit 818 does not have control of channel 116, control circuit changes switch 816 to connect clock recovery circuit 120 and de-interleaver 122 of reception circuitry 812 to channel 116, and outputs a control signal S2 to de-interleaver 122 of reception circuitry 814 that the de-interleaver can start receiving.

Figure 9:
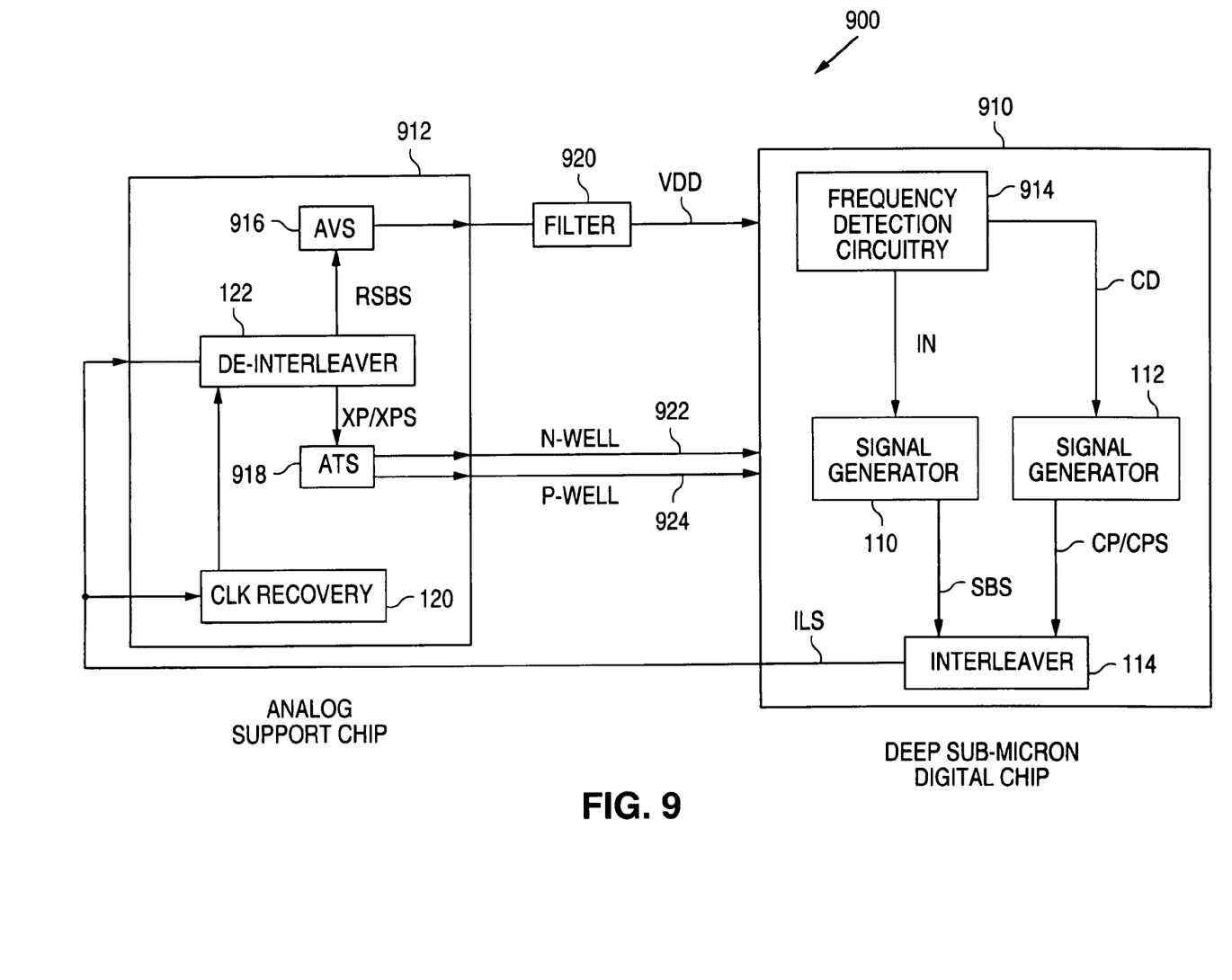
FIG. 9 is a block diagram illustrating a power management system 900 in accordance with the present invention.

One example of the use of communications system 100 is in a power management system. FIG. 9 shows a block diagram that illustrates a power management system 900 in accordance with the present invention. Power management system 900 includes a deep sub-micron digital chip 910 and an analog support chip 912 that is connected to digital chip 910. Digital chip 910 includes frequency detection circuitry 914, signal generator 110, signal generator 112, and interleaver 114.

Figure 10:
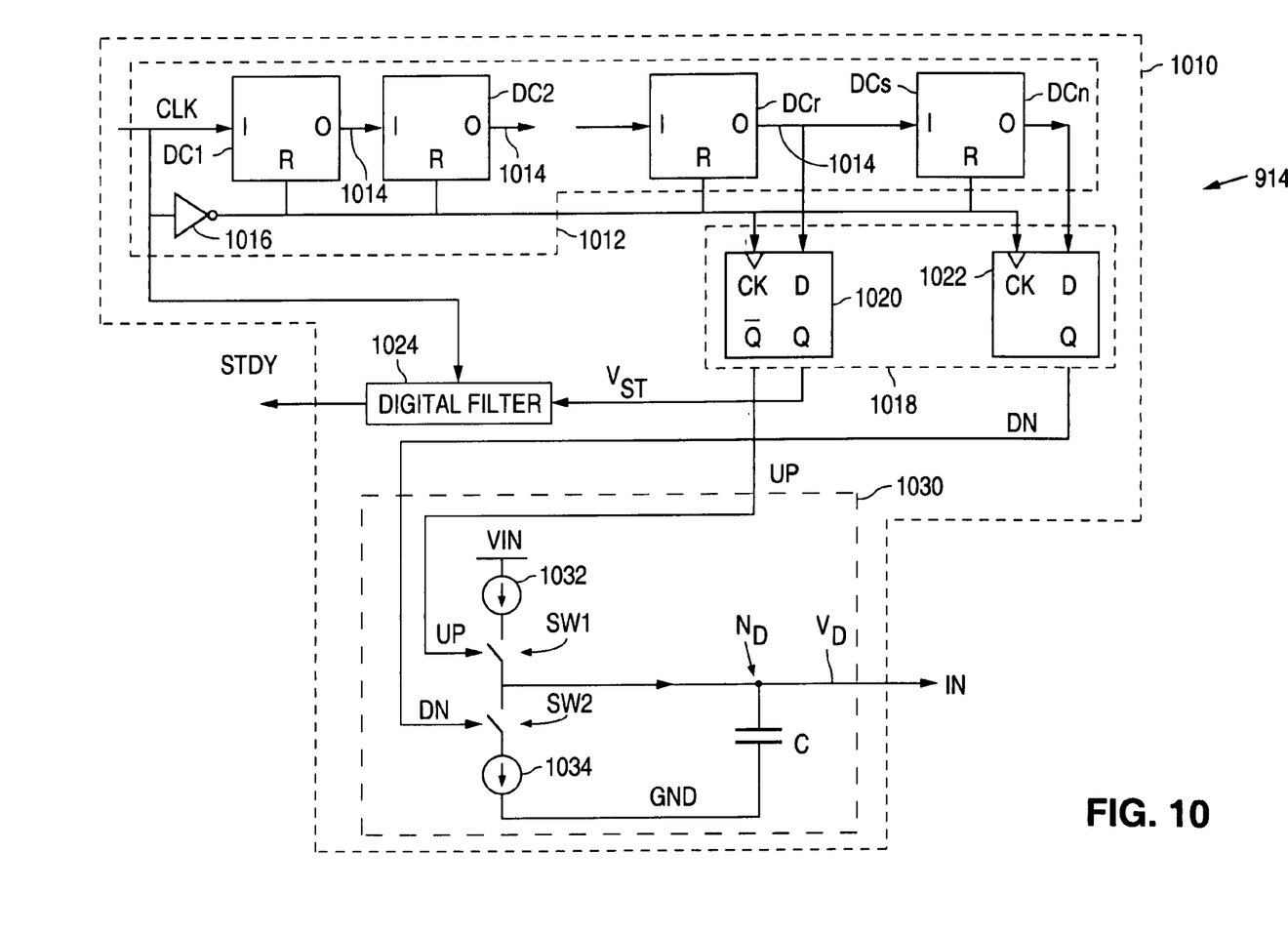
FIG. 10 is a block diagram illustrating an example of frequency detection circuitry 914 in accordance with the present invention.

Frequency detection circuitry 914 detects when the clock frequency changes from a first frequency to a second frequency and, when detected, adjusts the input signal IN to signal generator 110. FIG. 10 shows a block diagram that illustrates an example of frequency detection circuitry 914 in accordance with the present invention.

As shown in FIG. 10, frequency detection circuitry 914 includes a timing detector 1010 that receives a clock signal CLK, detects when the frequency of the clock signal CLK has changed from a first frequency to a second frequency, and generates detection information that identifies the frequency changes.

In the example shown in FIG. 10, timing detector 1010 includes a clock delay line 1012 that has a plurality of taps 1014. In operation, clock delay line 1012 detects frequency changes in the clock signal CLK by measuring the distance the rising edge of the clock signal CLK can travel down delay line 1012 before the falling edge of the clock signal CLK is detected.

For example, if a low frequency clock signal is input to a delay line, the rising edge of the clock signal will travel down the delay line a distance X before the falling edge is detected. On the other hand, if a high frequency clock signal is input to the delay line, the rising edge of the clock signal will travel a shorter distance down the delay line. In this case, a distance X-Y is traveled before the falling edge is detected because the period of the high frequency clock signal is shorter.

In the example shown in FIG. 10, clock delay line 1012 includes an inverter 1016 that has an input connected to receive the clock signal CLK, and a number of delay circuits DC1-DCn that each have a clock input I, a reset input R, and an output tap O. The delay circuits DC1-DCn are serially connected so that, except for first delay circuit DC1, the clock input I of each delay circuit DC is connected to the output tap O of the preceding delay circuit DC in the series. The first delay circuit DC1, in turn, is connected to receive the clock signal CLK. In addition, the reset input R of each delay circuit DC is connected to the output of inverter 1016.

Figures 11A, 11B:
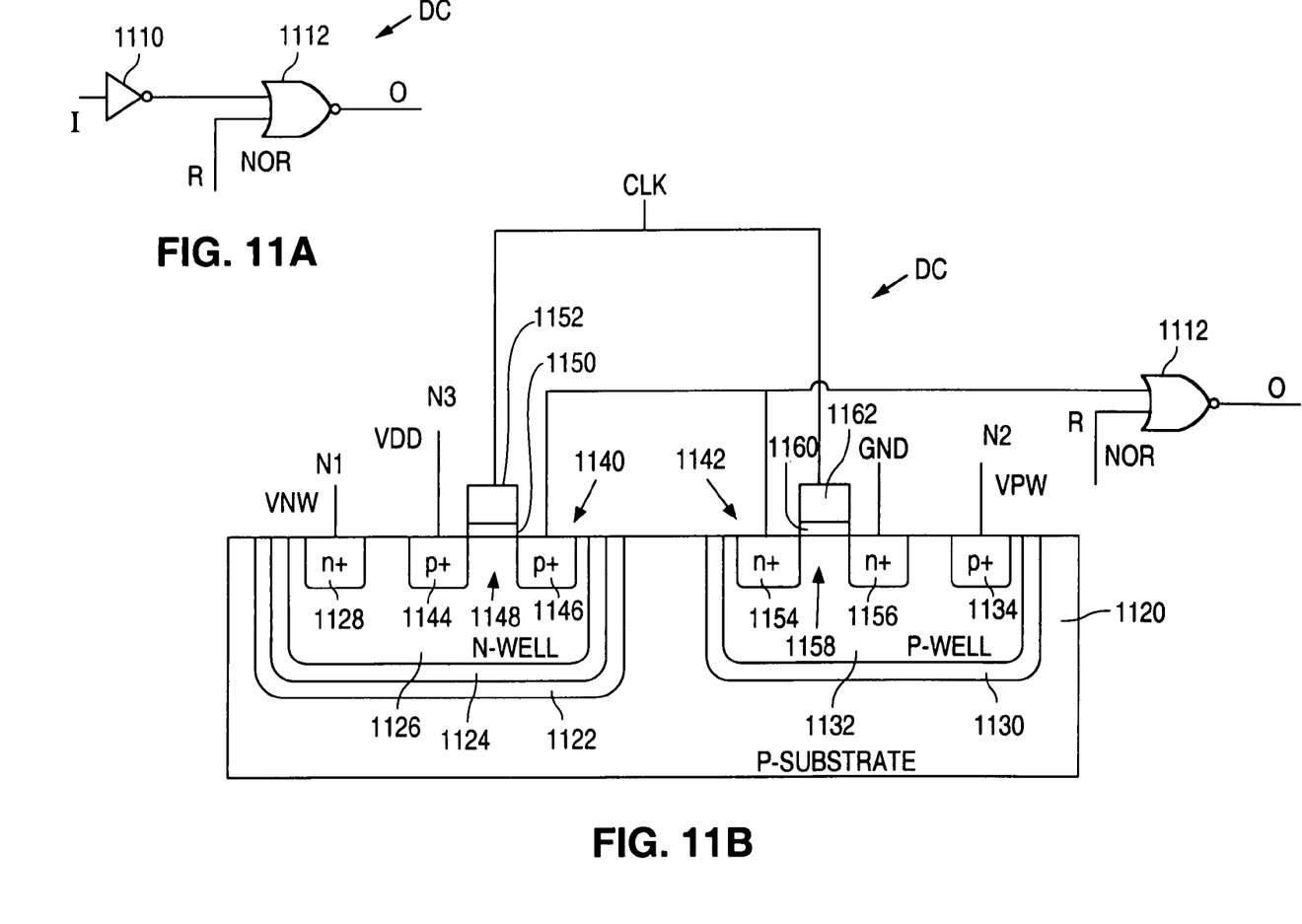
FIG. 11A is a block diagram illustrating an example of a delay circuit DC in accordance with the present invention.
FIG. 11B is a combination cross-sectional and block diagram further illustrating the delay circuit DC of FIG. 11A.

FIG. 11A shows a block diagram that illustrates an example of a delay circuit DC in accordance with the present invention. As shown in FIG. 11A, delay circuit DC includes an inverter 1110 that has an input connected to the clock input I. In addition, delay circuit DC also includes a NOR gate 1112 that has an input connected to the output of inverter 1110, an input connected to reset input R, and an output connected to output tap O. (Alternately, any odd number of serially connected inverters can be used in lieu of inverter 1110.)

FIG. 11B shows a combination cross-sectional and block diagram that further illustrates the delay circuit DC of FIG. 11A. As shown in FIG. 11B, delay circuit DC includes a p-type substrate 1120 and a first n-well 1122 that is formed in substrate 1120. Delay circuit DC also includes a first p-well 1124 that is formed in n-well 1122, and a second n-well 1126 that is formed in p-well 1124.

Second n-well 1126 includes a n+ contact region 1128 that is connected to an n-well node N1 to receive an n-well voltage VNW. Further, delay circuit DC includes a third n-well 1130 that is formed in substrate 1120, and a second p-well 1132 that is formed in n-well 1130. Second p-well 1132 includes a p+ contact 1134 that is connected to a p-well node N2 to receive a p-well voltage VPW.

As further shown in FIG. 11B, inverter 1110 of FIG. 11A is shown as a p-channel MOS transistor 1140 and an n-channel MOS transistor 1142. P-channel transistor 1140 includes spaced apart source and drain regions 1144 and 1146 that are formed in n-well 1126, and a channel region 1148 that is located between source and drain regions 1144 and 1146. Transistor 1140 also includes a layer of gate oxide 1150 that is formed over channel region 1148, and a gate 1152 that is formed on gate oxide layer 1150. Further, a supply node N3 is connected to source region 1144 to provide a supply voltage VDD.

N-channel transistor 1142 includes spaced apart source and drain regions 1154 and 1156 that are formed in p-well 1132, and a channel region 1158 that is located between source and drain regions 1154 and 1156. Transistor 1142 also includes a layer of gate oxide 1160 that is formed over channel region 1158, and a gate 1162 that is formed on gate oxide layer 1160. (Although not shown at the same level of detail, NOR gate 1112 is also formed from PMOS and NMOS transistors that are formed in n-well 1126 and p-well 1132, respectively.)

In operation, each delay circuit DC has a propagation delay d that depends on the supply voltage VDD applied to source region 1144 (and the transistors of NOR gate 1112), and the n-well voltage VNW applied to second n-well 1126. The propagation delay d also depends on the p-well voltage VPW applied to second p-well 1132.

In this example, the supply voltage VDD applied to source region 1144 (and the transistors of NOR gate 1112) is the supply voltage VDD applied to the MOS transistors of the digital circuit. In addition, the n-well voltage VNW applied to second n-well 1126 is the voltage applied to the n-well or wells that include the PMOS transistors of the digital circuit.

Further, the p-well voltage VPW applied to second p-well 1132 is the voltage applied to the p-well or wells that include the NMOS transistors of the digital circuit. As a result, the propagation delay d of each delay circuit DC depends on the supply voltage, the n-well voltage, and the p-well voltage of the MOS transistors of the digital circuit 910.

Referring again to FIG. 10, in addition to clock delay line 1012, timing detector 1010 also includes a logic block 1018 that is connected to the taps of two of the delay circuits DC in the series; a first selected delay circuit DCr and a second selected delay circuit DCs. Logic block 1018 outputs timing information in response to the voltage levels at the taps of the two selected delay circuits DCr and DCs when the falling edge of the clock signal CLK is detected.

Logic block 1018, in turn, includes a first edge-triggered DQ flip flop 1020 that has a data input D connected to output tap O of delay circuit DCr, and a clock input CK that is connected to the output of inverter 1016. In addition, flop 1020 has a Q output that generates an initial steady signal Vst, and a Qbar output that generates an up signal UP.

Logic block 1018 additionally includes a second edge-triggered DQ flip flop 1022 that has a data input D connected to output tap O of delay circuit DCs, and a clock input CK that is connected to the output of inverter 1016. In addition, flop 1022 has a Q output that generates a down signal DN.

The input of second selected delay circuit DCs can be directly connected to the output of first selected delay circuit DCr, or a number of delay circuits DC can be placed between first and second selected delay circuits DCr and DCs. In addition, the output taps O that are connected to data inputs D of flops 1020 and 1022 can be programmably selected, such as by setting a bit in a configuration register. Further, the initial steady signal Vst and the clock signal CLK can be input to a digital filter 1024 to produce a steady signal STDY that indicates when operation has stabilized.

Timing detector 1010 also includes a detection controller 1030 that varies a detection voltage VD on a detection node ND in response to the timing information. The detection voltage VD can be utilized as the input signal IN. In the example of FIG. 10, the detection voltage VD provides the detection information, and detection controller 1030 varies the detection voltage VD on detection node ND in response to the logic states of the timing signals UP and DN. Detection controller 1030 increases the detection voltage VD in response to the up signal UP, and decreases the detection voltage VD in response to the down signal DN.

As shown in FIG. 10, detection controller 1030 includes a current source 1032 that is connected to an input voltage VIN, and a first switch SW1 that is connected to current source 1032 and detection node ND, and is controlled by the up signal UP. Controller 1030 also includes a current sink 1034 that is connected to ground, and a second switch SW2 that is connected to current sink 1034 and the detection node ND, and is controlled by the down signal DN. Controller 1030 further includes a capacitor C that is connected between the detection node ND, which outputs the detection voltage VD, and ground.

Referring again to FIG. 9, in addition to digital chip 910, power management system 900 also includes analog support chip 912. Analog chip 912, in turn, includes clock recovery circuit 120, de-interleaver 122, a voltage scaler 916, and a threshold scaler 918. Voltage scaler 916 in analog support chip 912 responds to the recovered serial bit stream RSBS, and adjusts a supply voltage VDD via a filter 920 provided to digital chip 910 to minimize the power consumed at the second frequency.

In addition, frequency detection circuitry 914 also adjusts the control data CD to change the control pulse CP or pulses CPS. Analog support chip 912 responds to changes in the control pulse CP or pulses CPS and adjusts an n-well voltage 922 and a p-well voltage 924 provided to digital chip 910 to minimize the power consumed at the second frequency.

Thus, analog support chip 912 adjusts the supply voltage, the n-well voltage, and the p-well voltage of the digital circuits to minimize the power consumed at the second frequency in response to frequency information determined by frequency detection circuitry 914.

In the simplest case, frequency detection circuitry 914 detects when chip 910 is transmitting and receiving, and when chip is inactive and in a standby mode. Based on the detected frequency, frequency detection circuitry 914 varies the magnitude of the input voltage VIN to signal generator 110, and the control data CD to signal generator 112. Interleaver 114 then inserts the control pulse CP or pulses CPS into the serial bit stream output by signal generator 110 to generate the interleaved signal ILS.

As further shown in FIG. 9, de-interleaver 922 of analog support chip 912 outputs the received serial bit stream RSBS, which represents a recovered version of the serial bit stream SBS, to voltage scaler 916. Voltage scaler 916 then adjusts the power supply voltage VDD applied to digital chip 910 to minimize the power consumed by digital chip 910.

De-interleaver 122 also outputs the control pulse XP or pulses XPS, which represents a recovered version of the control pulse CP or pulses CPS, to threshold scaler 918. Threshold scaler 918 then adjusts the n-well voltage 930 and the p-well voltage 932 to adjust the threshold voltages of the transistors on digital chip 910 to minimize the power consumed by digital chip 910.

Thus, an example of a power management system in accordance with the present invention has been described. The system minimizes the power consumed by a deep submicron digital circuit by adjusting the supply voltage, the n-well voltage, and the p-well voltage of the circuit based on the clock frequency to voltage levels that minimize the power consumed at that frequency.

It should be understood that the above description is an example of the present invention, and that various alternatives to the invention described herein may be employed in practicing the invention. Thus, it is intended that the following claims define the scope of the invention and that methods and structures within the scope of these claims and their equivalents be covered thereby.

What is claimed is:

1. A communications system comprising:
a first signal generator that generates a serial bit stream in response to an input signal and a clock signal, the serial bit stream having a plurality of transitions and a plurality of gaps between transitions where transitions can not occur, the first signal generator being a pulse width modulator that modulates a duty cycle of the clock signal in response to the input signal to output the serial bit stream;
a second signal generator that generates a control pulse in response to a control signal; and
an interleaver connected to the first and second signal generators, the interleaver:
determining a position of a gap within the serial bit stream; and
inserting the control pulse into the gap to output an interleaved signal.

2. The communications system of claim 1 wherein the interleaver determines:
the clock signal,
a plurality of locked edges of the serial bit stream that are each locked to the clock signal,
a plurality of moving edges of the serial bit stream, a moving edge being located between each adjacent pair of locked edges, and
a gap space between each locked edge and an adjacent moving edge.

3. The communications system of claim 2 wherein the interleaver inserts the control pulse into the gap space when the gap space is large enough to accommodate the control pulse.

4. The communications system of claim 3 wherein the interleaver
identifies a position of a first edge, the first edge being locked to the clock signal;
identifies a position of a second edge connected to the first edge, the second edge being a first moving edge;
determines a position of a third edge that is connected to the second edge, the third edge being locked to the clock signal; and
determines a range of positions of a fourth edge that is connected to the third edge, the fourth edge being a moving edge.

5. The communications system of claim 4 wherein the range of positions is based on a position of the second edge.

6. The communications system of claim 4 wherein
each pulse within the serial bit stream has a minimum duty cycle and a maximum duty cycle, the minimum duty cycle being greater than 10% and less than 50%, the maximum duty cycle being less than 90% and greater than 50%, and
the interleaver can insert a control pulse between the rising and falling edges of a minimum duty cycle signal, and between the falling edge of the minimum duty cycle signal and the rising edge of a next duty cycle signal.

7. A communications system comprising:
a first signal generator that generates a serial bit stream in response to an input signal and a clock signal, the serial bit stream having a plurality of transitions and a plurality of gaps between transitions where transitions can not occur, the first signal generator being a pulse polarity modulator that modulates a polarity of the clock signal in response to the input signal and a feedback signal to output the serial bit stream;
a second signal generator that generates a control pulse in response to a control signal; and
an interleaver connected to the first and second signal generators, the interleaver:
determining a position of a gap within the serial bit stream; and
inserting the control pulse into the gap to output an interleaved signal.

8. The communications system of claim 7 wherein the interleaver determines:
the clock signal, and
a gap space between each leading and trailing edge of the clock signal, and between each trailing edge and a next leading edge of the clock signal.

9. The communications system of claim 8 wherein the interleaver inserts the control pulse into the gap space to form the interleaved signal.

10. A communications system comprising:
a first signal generator that generates a serial bit stream in response to an input signal and a clock signal, the serial bit stream having a plurality of transitions and a plurality of gaps between transitions where transitions can not occur, the first signal generator being a pulse position modulator that:
generates a symbol clock signal; and
outputs a pulse during each symbol period in response to the input signal to output the serial bit stream, a position of the pulse within the symbol period conveying information;
a second signal generator that generates a control pulse in response to a control signal; and
an interleaver connected to the first and second signal generators, the interleaver:
determining a position of a gap within the serial bit stream; and
inserting the control pulse into the cap to output an interleaved signal.

11. The communications system of claim 10 wherein the interleaver determines:
the symbol period,
the position of the pulse within the symbol period, and
a gap space before and after the position of the pulse.

12. The communications systems of claim 11 wherein the interleaver inserts the control pulse into the gap space to form the interleaved signal when the gap space is large enough to accommodate the control pulse.

13. A communications system comprising:
a first signal generator that generates a serial bit stream in response to an input signal and a clock signal, the serial bit stream having a plurality of transitions and a plurality of gaps between transitions where transitions can not occur;
a second signal generator that generates a control pulse in response to a control signal;
an interleaver connected to the first and second signal generators, the interleaver:
determining a position of a gap within the serial bit stream; and
inserting the control pulse into the gap to output an interleaved signal;
a communications channel connected to the interleaver;
a clock recovery circuit connected to the communications channel to receive the interleaved signal, the clock recovery circuit outputting a recovered clock signal; and a de-interleaver connected to the communications channel to receive the interleaved signal, and the clock recovery circuit to receive the recovered clock signal, the de-interleaver removing the control pulse from the interleaved signal to output a received serial bit stream that represents a recovered version of the serial bit stream, and the serial bit stream from the interleaved signal to output a received control pulse that represents a recovered version of the control pulse.

14. The communications system of claim 13 and further comprising:
   a first device, the first device having:
      a first switch connected to the communications channel;
      first transmit circuitry connected to the first switch, the first transmit circuitry having a first signal generator, a second signal generator, and an interleaver; and
      first receive circuitry connected to the first switch, the first receive circuitry having a clock recovery circuit and a de-interleaver; and
   a second device, the second device having:
      a second switch connected to the communications channel;
      second transmit circuitry connected to the second switch, the second transmit circuitry having a first signal generator, a second signal generator, and an interleaver; and
      second receive circuitry connected to the second switch, the second receive circuitry having a clock recovery circuit and a de-interleaver.

15. A communications system comprising:
   a first signal generator to generate a series of first pulses, each first pulse in the series having a first edge, a second edge, and an equivalent pulse period;
   a second signal generator to generate a second pulse; and
   an interleaver connected to the first and second signal generators, the interleaver to detect the first edge of a first pulse of the series of first pulses in a pulse period, determine where the second edge of the first pulse can not occur during the pulse period, and insert the second pulse in the pulse period where the second edge of the first pulse can not occur.

16. The communications system of claim 15 wherein the second pulse is inserted before the first edge of the first pulse.

17. The communications system of claim 15 wherein the second pulse is inserted between the first and second edges of the first pulse.

18. The communications system of claim 15 wherein the second pulse is inserted after the second edge of the second pulse.

19. The communications system of claim 15 wherein the first edge of the first pulse is a leading edge and the second edge of the first pulse is a trailing edge.

20. The communications system of claim 15 wherein the second edge of the first pulse is a leading edge and the first edge of the first pulse is a trailing edge.

21. The communications system of claim 15 and further comprising a detection circuit connected to the first signal generator and the second signal generator, the detection circuit to receive a supply voltage, a threshold voltage, and a clock signal, and output a scaling signal to the first signal generator, and a threshold signal to the second signal generator, the scaling signal to indicate a timing of the clock signal at the supply voltage and the threshold voltage, the first pulses reflecting a value of the scaling signal such that the first signal generator changes a characteristic of the first pulses when the value of the scaling signal changes, the second pulse reflecting a value of the threshold signal such that the second signal generator changes a characteristic of the second pulse when the value of the threshold signal changes.

22. The communications system of claim 21 and further comprising a voltage controller connected to the interleaver, the voltage controller to detect changes in the characteristic of the first pulses, change the supply voltage in response to changes in the characteristic of the first pulses, detect changes in the characteristic of the second pulse, and change the threshold voltage in response to changes in the characteristic of the second pulse.

23. The communications system of claim 22 wherein the characteristic is a pulse width.

24. The communications system of claim 22 wherein the characteristic is a pulse polarity.

25. A method of communicating comprising:
   generating a series of first pulses, each first pulse in the series having a first edge, a second edge, and an equivalent pulse period;
   generating a second pulse; and
   detecting the first edge of a first pulse of the series of pulses in a pulse period, determining where the second edge of the first pulse can not occur in the pulse period, and inserting the second pulse in the pulse period where the second edge of the first pulse can not occur.

26. The method of claim 25 wherein the second pulse is inserted before the first edge of the first pulse.

27. The method of claim 25 wherein the second pulse is inserted between the first and second edges of the first pulse.

28. The method of claim 25 wherein the second pulse is inserted after the second edge of the second pulse.

29. The method of claim 25 and further comprising:
   measuring a clock signal timing in a circuit connected to a supply voltage and a threshold voltage to output a scaling signal and a threshold signal;
   changing a characteristic of the first pulses when the value of the scaling signal changes; and
   changing a characteristic of the second pulse when the value of the threshold signal changes.

30. The method of claim 29 and further comprising detecting changes in the characteristic of the first pulses, changing the supply voltage in response to changes in the characteristic of the first pulses, detecting changes in the characteristic of the second pulse, and changing the threshold voltage in response to changes in the characteristic of the second pulse.

* * * * *

UNITED STATES PATENT AND TRADEMARK OFFICE
CERTIFICATE OF CORRECTION

| | |
|---|---|
| PATENT NO. | : 7,079,589 B1 |
| APPLICATION NO. | : 10/166822 |
| DATED | : July 18, 2006 |
| INVENTOR(S) | : Maksimovic et al. |

Page 1 of 1

It is certified that error appears in the above-identified patent and that said Letters Patent is hereby corrected as shown below:

<u>Column 8,</u>

Line 52, delete "replaced" and replace with --placed--.

<u>Column 14,</u>

Line 38, delete "cap" and replace with --gap--.

Signed and Sealed this

Nineteenth Day of September, 2006

JON W. DUDAS
*Director of the United States Patent and Trademark Office*